United States Patent [19]

Fujii et al.

[11] 4,135,635

[45] Jan. 23, 1979

[54] DUAL-PART CAP ASSEMBLY FOR SEALED FLUID RESERVOIRS

[75] Inventors: Takashi Fujii; Hiroyuki Nakamura; Teruo Souma, all of Toyota, Japan

[73] Assignees: Aisin Seiki Kabushiki Kaisha, Kariya; Toyota Jidosha Kogyo Kabushiki Kaisha, Toyota, both of Japan

[21] Appl. No.: 864,480

[22] Filed: Dec. 27, 1977

Related U.S. Application Data

[63] Continuation of Ser. No. 750,425, Dec. 14, 1976, abandoned.

[30] Foreign Application Priority Data

Dec. 23, 1975 [JP] Japan .................................. 50-154208

[51] Int. Cl.² ...................... B65D 41/16; B65D 51/16; B60T 11/26
[52] U.S. Cl. .................................. 220/85 B; 220/282; 220/367; 215/224; 215/301; 215/307; 215/317; 303/85
[58] Field of Search ............... 215/224, 301, 307, 310, 215/317; 220/85 B, 281, 282, 303, 360, 367, 378; 303/85; 60/585; 277/237 R

[56] References Cited

U.S. PATENT DOCUMENTS

| 2,952,128 | 9/1960 | Highland | 60/585 X |
| 3,196,617 | 7/1965 | Ferrell et al. | 60/585 |
| 3,484,016 | 12/1969 | Turner | 215/301 X |
| 3,782,575 | 1/1974 | Braun | 215/224 X |
| 3,860,137 | 1/1975 | Wilson | 215/224 |

FOREIGN PATENT DOCUMENTS

| 1430349 | 10/1968 | Fed. Rep. of Germany | 220/85 B |
| 666194 | 8/1964 | Italy | 220/85 B |
| 980916 | 1/1965 | United Kingdom | 60/585 |
| 1245126 | 9/1971 | United Kingdom | 220/85 B |

Primary Examiner—Robert S. Ward, Jr.
Attorney, Agent, or Firm—Stevens, Davis, Miller & Mosher

[57] ABSTRACT

A seal cap assembly for a reservoir casing comprises a first seal cap having an annular thick rim portion detachably secured over the upper opening of the casing and a vertical expansible diaphragm formed in a piece with the inner periphery of the rim portion to be disposed within the casing and a second cap assembled with the thick rim portion of the first cap to facilitate removal of the cap assembly from the casing by a pushing force given to the second cap.

5 Claims, 1 Drawing Figure

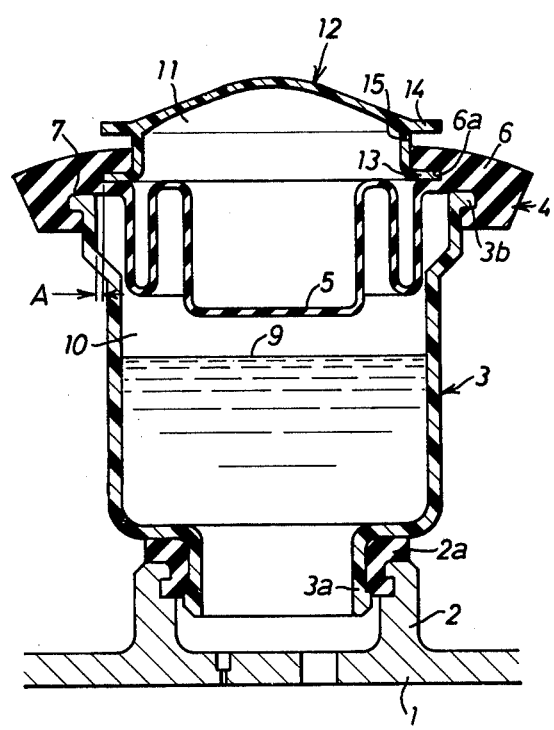

DUAL-PART CAP ASSEMBLY FOR SEALED FLUID RESERVOIRS

This is a Continuation of application Ser. No. 750,425 filed Dec. 14, 1976 and now abandoned.

BACKGROUND OF THE INVENTION

The present invention relates to a sealed fluid reservoir for a hydraulic brake master cylinder, and more particularly to a seal cap assembly for the fluid reservoir to air-tightly seal brake fluid in the reservoir regardless of increases or decreases of the brake fluid.

SUMMARY OF THE INVENTION

The primary object of the present invention is to provide an improved seal cap assembly for a reservoir casing which is substantially composed of two assembling parts to facilitate assembling work and reduce the production cost.

Another object of the present invention is to provide an improved seal cap assembly for a reservoir casing in which a first seal cap is detachably secured over the upper opening of the casing and includes a vertically expansible diaphragm located in the casing to seal brake fluid and a second cap is mounted on the first cap, thereby to facilitate removal of the cap assembly from the casing simply by applying pushing force to the second cap.

In accordance with a preferred embodiment of the present invention, there is provided a seal cap assembly for a reservoir casing having an annular stepped flange at the outside of the upper opening thereof, which comprises a first cap made of synthetic rubber and including an annular thick rim portion to be detachably secured over the stepped flange of the casing and a vertically expansible diaphragm preferably formed integrally with the inner periphery of the rim portion to be disposed within the casing; and a second cap assembled with the thick rim portion of the first cap to form an air chamber above the diaphragm and provided at the side-wall thereof with a vent hole to connect the air chamber to the surrounding air; whereby when the first cap is secured at the thick rim portion thereof over the stepped flange of the casing, the inner circumferential flat wall of the rim portion engages the upper annular surface of the stepped flange to air-tightly seal brake fluid stored in the casing by the diaphragm of the first cap.

In a further aspect, the thick rim portion of the first cap is provided at the inside wall thereof with a radially opening annular groove and the second cap is a dome shaped cap made of hard synthetic resin, light metals or the like and has a radially extending annular rim pressed into the groove of the first cap, the outer diameter of the annular rim being smaller than the inner diameter of the upper opening of the casing, whereby the thick rim portion of the first cap secured over the stepped flange of the casing is deflected by applying a pushing force to the second cap to remove the first cap from the casing.

BRIEF DESCRIPTION OF THE DRAWING

The above-mentioned and objects and features of the present invention will become clear from the following description with reference to the accompanying drawing, in which the single FIGURE is a sectinal elevation view of a sealed fluid reservoir adapted to a hydraulic brake master cylinder.

DESCRIPTION OF THE PREFERRED EMBODIMENT

Referring now to the drawing, there is illustrated a reservoir casing 3 of which the bottom opening neck 3a is fluid-tightly mounted on an annular boss 2 of a master cylinder body 1 by way of an annular sealing grommet 2a. The reservoir casing 3 is made of translucent synthetic resin and provided at the outside of the upper opening thereof with an annular stepped flange 3b on which a seal cap 4 is pressedly coupled. The seal cap 4 is made of synthetic rubber and includes a vertically expansible diaphragm 5 and an annular thick rim portion 6. The rim portion 6 is formed in a predetermined thickness and engages the inner circumferential flat wall 7 thereof with the upper annular surface of the stepped flange 3b. The diaphragm 5 is provided to seal brake fluid in the casing 3 and to form a hermetic chamber 10 above the fluid surface 9. The diaphragm 5 is downwardly expanded at the central portion thereof to minimize the capacity of the hermetic chamber 10 and is vertically movable in accordance with variation of the fluid level 9.

On the seal cap 4, a second dome shaped cap 12 is provided to prevent entrance of water, contaminates, etc. into an air chamber 11. The second cap 12 is made of hard synthetic rubber and has a radially extending annular rim 13 pressed into an annular groove 6a of the thick rim portion 6. In this assembling, the outer diameter of the annular rim 13 is smaller than the inner diameter of the upper opening of the casing 3 to provide an annular clearance A. Due to the annular clearance A, the rim portion 6 of the seal cap 4 can be deflected at the inner circumferential wall thereof by downward pushing force applied to the second cap 12 so that removal of seal cap 4 from the stepped flange 3b of the casing 3 is facilitated. The second cap 12 is further provided at the side wall thereof with a vent hole 15 to connect the air chamber 11 to the surrounding air and with an annular brim 14 to cover the vent hole 15.

The seal cap assembly composed of the seal cap 4 and the second cap 12 is characterized in that the thick rim portion 6 and the diaphragm 5 of the seal cap 4 are preferably formed in a single piece to minimize the assembling of parts. The second cap 12 is fitted into the thick rim portion of the seal cap 4 without any fastening elements to simplify the assembling process. Furthermore, it will be recognized that the cap assembly can easily be removed from the casing by applying a force due to the above-noted annular clearance A.

Although a certain specific embodiment of the present invention has been shown and described, it is obvious that many modifications and variations thereof are possible in light of these teachings. For instance, the second cap 12 may be made of hard synthetic resin, light metals and the like. It is to be understood therefore that within the scope of the appended claims, the invention may be practiced otherwise than as specifically described herein.

What is clamed is:

1. A seal cap assembly for a reservoir casing for a hydraulic brake master cylinder, the casing having an annular stepped flange at the outside of the upper opening thereof, said seal cap comprising a first cap made of synthetic rubber and including an annular thick rim portion to be resiliently coupled over the stepped flange of said casing and a vertically expansible diaphragm integrally formed with the inner periphery of the rim portion, the rim portion having at the inside wall thereof a radially opening annular groove; and a second cap having a radially extending annular rim pressed into the groove of said cap to form an air chamber above the diaphragm and a vent hole to connect the air chamber to the surrounding air; whereby when the thick rim portion of said first cap is secured over the stepped flange of said casing, the inner circumferential flat wall of the rim portion engages an upper annular surface of the stepped flange to air-tightly seal brake fluid in said casing by the diaphragm of said first cap.

2. A seal cap assembly as claimed in claim 1, wherein the outer diameter of the annular rim is smaller than the inner diameter of the upper opening of said casing, whereby the thick rim portion of said first cap secured over the stepped flange of said casing can be deflected by a pushing force applied to said second cap to facilitate removal of said first cap from said casing.

3. A seal cap assembly as claimed in claim 2, wherein said second cap is made of hard synthetic rubber and provided at the head portion thereof with an annular brim to cover said vent hole.

4. A seal cap assembly as claimed in claim 3, wherein said second cap is formed in a dome shape.

5. A seal cap assembly for a reservoir casing for a hydraulic brake master cylinder, the casing having an annular stepped flange at the outside of the upper opening thereof, said seal cap comprising a first cap made of synthetic rubber and including an annular thick rim portion to be resiliently coupled over the stepped flange of said casing and a vertically expansible diaphragm integrally formed with the inner periphery of the rim portion, the rim portion having at the inside wall thereof a radially opening annular groove; a second dome shaped cap made of hard synthetic resin and having a radially extending annular rim pressed into the groove of said cap to form an air chamber above the diaphragm; and means for placing the surrounding air in communication with the air chamber; whereby when said first cap is secured at the thick rim portion over the stepped flange of said casing, an inner circumferential flat wall of the rim portion engages the upper annular surface of the stepped flange to air-tightly seal brake fluid in said casing by the diaphragm of said first cap.

* * * * *